UNITED STATES PATENT OFFICE.

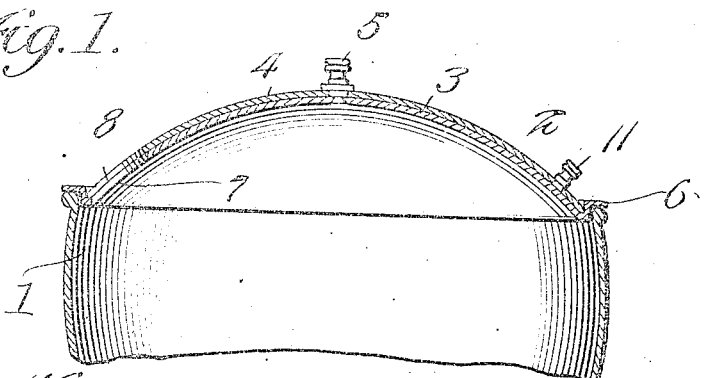
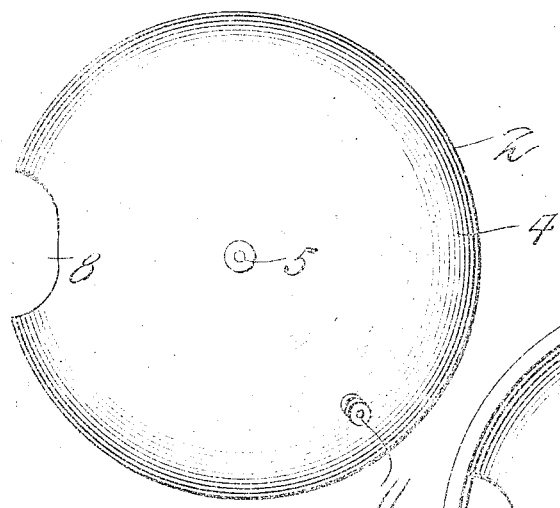
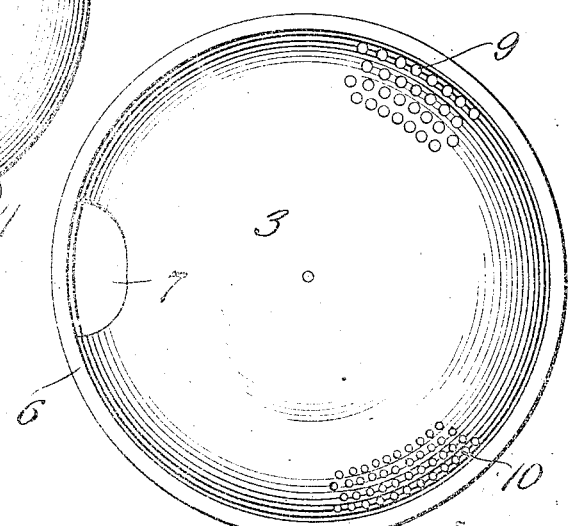

WILLIAM HENRY OSTRANDER, OF REDICKVILLE, ONTARIO, CANADA.

COVER FOR COOKING UTENSILS.

936,025.  Specification of Letters Patent.  Patented Oct. 5, 1909.

Application filed September 29, 1908. Serial No. 455,278.

*To all whom it may concern:*

Be it known that I, WILLIAM HENRY OSTRANDER, a subject of the King of Great Britain, residing at Redickville, in the Province of Ontario and Dominion of Canada, have invented new and useful Improvements in Covers for Cooking Utensils, of which the following is a specification.

This invention relates to pot covers for use in connection with culinary articles and has for an object to provide a cover of this character adapted to be effectively used in the straining of potatoes, beans, peas, carrots, parsnips, spinach or the like.

Other objects and advantages will be apparent as the nature of the invention is better disclosed, and it will be understood that changes within the scope of the claim, may be resorted to without departing from the spirit of the invention.

In the drawings, forming a portion of this specification, and in which like numerals of reference indicate similar parts in the several views, Figure 1 is a section through a portion of a pot showing the application of the cover thereto, Fig. 2 is a bottom plan view of the cover, Fig. 3 is a top plan view.

Referring now more particularly to the drawings, there is shown a pot 1 which may be of any preferred form adapted to receive the cover 2 comprising circular concavo-convex elements 3 and 4, the element 3 will be described hereinafter as an inner element, and the element 4 an outer element. A knob or handle 5 is provided for the elements forming the cover, and the element 4 is revolubly connected to the said knob, while the inner element is fixed thereto so that the said outer element may be conveniently and effectively revolved while the inner element remains stationary. The inner element 3 is provided with a peripheral flange 6 adapted to seat itself upon the peripheral edge of the pot 1 and the said flange is offset preferably in a vertical plane from the lower edge of the said element 3, and is thus adapted to receive the peripheral edge of the element 4 as will be clearly seen upon reference to Fig. 1 of the drawings. The inner element 3 is provided with a discharge passage 7, and the outer element 4 is provided with a discharge passage 8 which, when the latter element is revolved sufficiently, may aline with the passage 7 as will be readily understood. The purpose of the passages 7 and 8 is to effectively strain large articles such as potatoes or the like. The inner element 3 is provided with a plurality of enlarged perforations 9, and the said element is also provided with a plurality of reduced perforations 10. The perforations 9 and 10 are located adjacent to the peripheral edge of the said element and are normally closed by the outer element 4 as is obvious. When it is desired to use either of the plurality of perforations 9 and 10, the outer element is revolved so that the passage 8 may be brought into registration with the said perforations. To conveniently revolve the outer element 4, I provide adjacent to the peripheral edge of said element a knob or handle 11 which may be of any well known form. It may be mentioned that the small perforations are used when straining small objects, and the perforations 9 may be used for ordinary straining purposes.

From the construction herein set forth and described, it will be seen that a simple and inexpensive cover for cooking utensils is provided and may be applied to pots of various forms without changing the same.

Having thus fully described the invention, what is claimed new, is:—

As an article of manufacture, a cover for cooking utensils comprising inner and outer elements of concavo-convex form provided with passages in their peripheral edges adapted to aline with each other, the passage in the inner element being closed normally by portions of the outer element, said inner element having a peripheral flange adapted to be seated upon the peripheral edge of a pot, said inner element having groups of perforations of different sizes adapted to be closed normally by the outer element, a knob carried by the inner element and engaged with the outer element so that the latter may be rotated upon the former, and a knob carried by the outer element adapted for operation to rotate the said outer element when the knob carried by the inner element is held stationary.

In testimony whereof I affix my signature in presence of two witnesses.

WILLIAM HENRY OSTRANDER.

Witnesses:
G. M. VANCE,
ANNIE E. SANFORD.